United States Patent
Qi (10) Patent No.: US 12,337,614 B2
(45) Date of Patent: Jun. 24, 2025

(54) TWO-WHEEL CASTER

(71) Applicant: T&S CO., LTD., Saitama (JP)

(72) Inventor: Zhenxi Qi, Saitama (JP)

(73) Assignee: T&S CO., LTD., Koshigaya (JP)

( * ) Notice: Subject to any disclaimer, the term of this patent is extended or adjusted under 35 U.S.C. 154(b) by 0 days.

(21) Appl. No.: 18/639,491

(22) Filed: Apr. 18, 2024

(65) Prior Publication Data
US 2025/0010662 A1 Jan. 9, 2025

(30) Foreign Application Priority Data
Jul. 7, 2023 (JP) .................................. 2023-111870

(51) Int. Cl.
*B60B 33/04* (2006.01)
*A45C 5/14* (2006.01)
*B60B 33/00* (2006.01)

(52) U.S. Cl.
CPC .............. *B60B 33/045* (2013.01); *A45C 5/14* (2013.01); *B60B 33/0042* (2013.01); *B60B 33/0049* (2013.01); *B60B 33/0068* (2013.01); *B60B 2200/45* (2013.01); *B60B 2900/131* (2013.01)

(58) Field of Classification Search
CPC .............. B60B 33/045; B60B 33/0042; B60B 33/0049; B60B 33/0068; B60B 2200/45; B60B 2900/131
USPC ........................................................... 16/44
See application file for complete search history.

(56) References Cited

U.S. PATENT DOCUMENTS

| | | | | |
|---|---|---|---|---|
| 776,321 | A * | 11/1904 | Hartwig | A01B 63/166 280/83 |
| 2,923,961 | A * | 2/1960 | Black | B60B 33/045 16/21 |
| 4,467,496 | A * | 8/1984 | Gregg | F16F 1/025 16/18 B |
| 4,649,595 | A * | 3/1987 | Shane | B60B 33/045 16/18 CG |
| 6,532,623 | B1 * | 3/2003 | Watanabe | B60B 33/0068 267/257 |
| 6,892,421 | B2 * | 5/2005 | Cooper | B60B 33/045 16/35 D |

(Continued)

FOREIGN PATENT DOCUMENTS

GB 2127287 A * 4/1984 .......... B60B 33/021
JP H04117929 A * 4/1992

(Continued)

*Primary Examiner* — Jeffrey O'Brien
(74) *Attorney, Agent, or Firm* — Rankin, Hill & Clark LLP (57) ABSTRACT

A two-wheel caster includes a rotation shaft component, an arm member provided with a hollow, an axle attached to the arm member, a left wheel and a right wheel attached to the axle. The arm member includes an axle supporting member which is stored in the hollow so as to be movable up and down, and which supports the axle, a compression coil spring which is stored in the hollow, and which pushes the axle supporting member, and a main rib surrounding the hollow. The axle supporting member includes an axle receiving portion which is formed in a tadpole-like shape, corresponds to a head of such a shape, and is provided with a shaft hole through which the axle is inserted, and a cantilever spring portion which corresponds to a tail of the tadpole-like shape, and which is continuous to the main rib.

3 Claims, 8 Drawing Sheets

(56) References Cited

U.S. PATENT DOCUMENTS

| | | | | |
|---|---|---|---|---|
| 7,195,322 | B2* | 3/2007 | Lin | A45C 5/14 |
| | | | | 301/5.304 |
| 7,648,150 | B2* | 1/2010 | Chen | B62B 9/18 |
| | | | | 280/124.179 |
| 9,636,948 | B2* | 5/2017 | Hillaert | A45C 5/14 |
| 10,322,606 | B2* | 6/2019 | Tang | B60B 33/0042 |
| 10,897,970 | B2* | 1/2021 | Hillaert | A45C 5/14 |
| 11,077,708 | B2* | 8/2021 | Kwa | B60B 33/045 |
| 11,712,924 | B2* | 8/2023 | Peterson | B60B 33/0068 |
| | | | | 16/19 |
| 2003/0066162 | A1* | 4/2003 | Kuo | B60B 33/0005 |
| | | | | 16/44 |
| 2006/0288526 | A1* | 12/2006 | Larson | B60B 33/045 |
| | | | | 16/44 |
| 2011/0227304 | A1* | 9/2011 | Lai | B60B 33/0068 |
| | | | | 280/81.6 |

FOREIGN PATENT DOCUMENTS

| | | | |
|---|---|---|---|
| JP | 3195358 U | * | 1/2015 |
| JP | 2015-067100 A | | 4/2015 |
| JP | 3204364 U | * | 6/2016 |
| JP | 3241970 U | * | 5/2023 |

* cited by examiner

FIG.5A
COMPARATIVE EXAMPLE 1

FIG.5B
COMPARATIVE EXAMPLE 2

TWO-WHEEL CASTER

FIELD OF THE INVENTION

The present disclosure relates to a two-wheel caster attached to a suitcase, etc.

BACKGROUND

A traveler carries personal belongings necessary for a travel like clothing (will be referred to as "packed goods" below) in a suitcase, a large-size baggage, etc., (will be collectively referred to as a "suitcase" below). Since a suitcase that is greater than or equal to a middle size is inevitably heavy, it is common that casters are provided at the bottom of the suitcase. Since the wheel of the caster rotates on a floor or on a road surface (will be referred to as a "floor" below), what is necessary for the traveler is just to pull the suitcase aside.

Meanwhile, on a floor, there are attached braille blocks, a laid-down resilient flooring covering, a laid down carpet, a joined portion of floor tiles, and other concavities and convexities. Those will be collectively referred to as an "unevenness" according to the present disclosure.

When the wheel is going over an unevenness, the suitcase moves up and down. This up-and-down movement applies shock to the packed goods and to the suitcase itself. From the standpoint of protection for the suitcase itself and for the packed goods, it is desirable to ease the up-and-down movement.

Hence, conventionally, dampener casters have been put to practical use. An example of such a dampener caster is disclosed in, for example, JP 2015-67100A.

A dampener caster disclosed in JP 2015-67100A will be described with reference to FIGS. 8A to 8D.

Figures 8A, 8B:
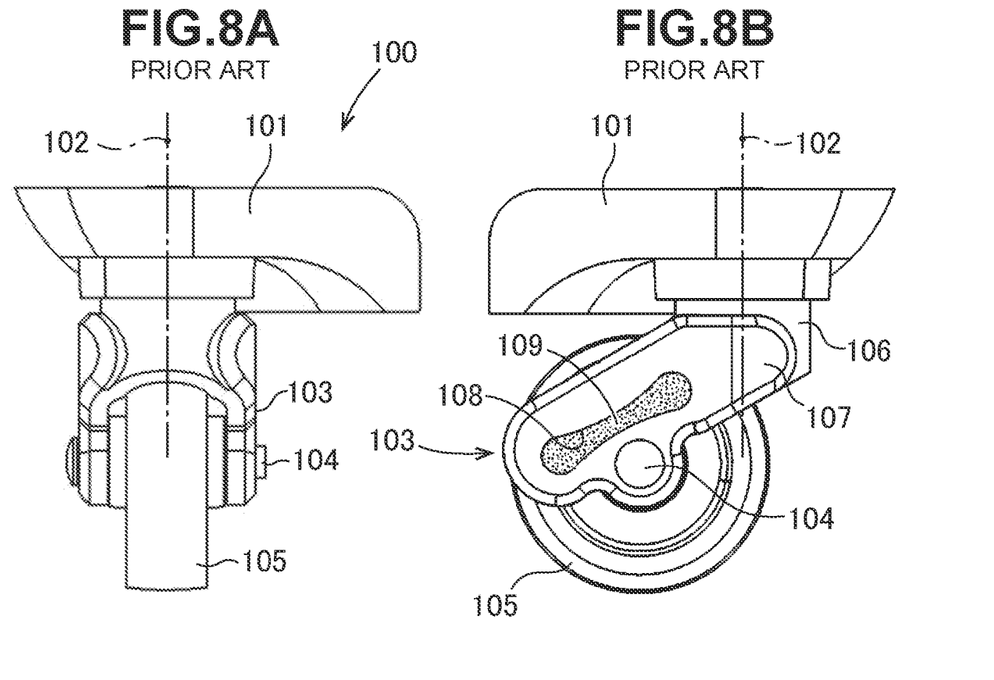
FIGS. 8A to 8D are diagrams for describing the basic structure of a conventional dampener caster and the action thereof.

As illustrated in FIG. 8A, a dampener caster 100 includes a base member 101 fastened to the bottom of a suitcase, a fork member 103 attached to the base member 101 so as to be freely turnable around a vertical axis 102, an axle 104 elongated horizontally across the lower ends of the fork member 103, and a wheel 105 supported by the axle 104.

As illustrated in FIG. 8B, the fork member 103 includes a turn bearing portion 106 that extends along the vertical axis 102, and arm portions 107 that extend obliquely downwardly from the lower end of the turn bearing portion 106. Each arm portion 107 is provided with a gourd-shape hollow 108 that is formed along the lengthwise axis. A vibration absorbing member 109 is filled in each hollow 108.

The axle 104 is attached to the arm portion 107 at the substantially center and lower position relative to the gourd-shape hollow 108.

Figure 8C:
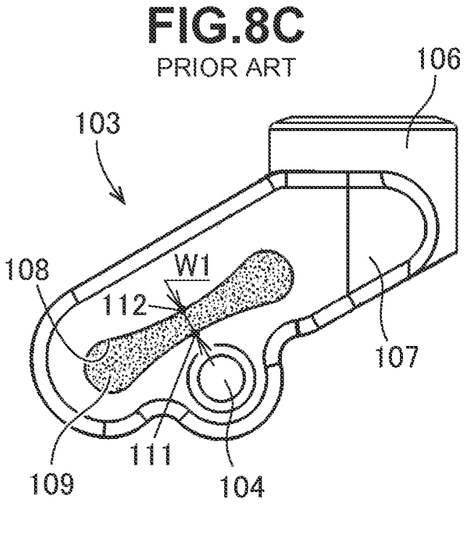

As illustrated in FIG. 8C, in an unloaded state, as for the center width of the hollow 108, W1 is maintained. When the wheel 105 is on the unevenness of the floor, upward force is applied to the axle 104. This causes a lower-part center point 111 of the hollow 108 moves upwardly. However, an upper-part center point 112 of the hollow 108 is not displaced.

Figure 8D:
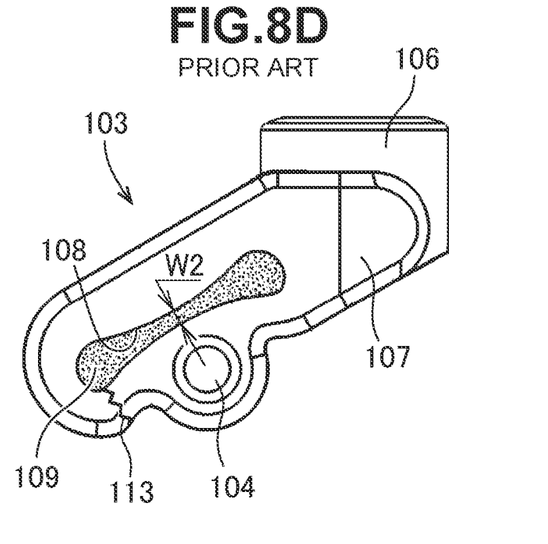

Consequently, as illustrated in FIG. 8D, the center width of the hollow 108 changes to W2 that is smaller than W1. Since the vibration absorber 109 is compressed by what corresponds to (W1-W2), the vibration absorber 109 absorbs shock. Simultaneously, since a part of the arm portion 107 (a lower part relative to the hollow 108) elastically deforms, the arm portion 107 also absorbs shock.

When the wheel 105 goes over the unevenness and upward force is dissipated, the arm portion 107 is brought back to a state in FIG. 8C.

As described above, the dampener caster 100 that eases shock when the wheel 105 runs is provided. However, the dampener caster 100 has the technical disadvantages to be described below.

First, (W1-W2) that is described with reference to FIGS. 8C and 8D is not large. When (W1-W2) is not large, it is difficult to cope with a large unevenness. However, if (W1-W2) is increased, the fork member 103 increases its dimension. This affects the external appearance, and increases the weight and costs.

Hence, there is a desire for enhancing a shock absorbing performance without a cost increase.

Second, when it is utilized for a long time period, the number of times of going over the unevenness increases. When the number of times of going over the unevenness increases, fatigue is accumulated. Accumulated fatigue forms a crack 113 at one end (or both ends) of the hollow 108 as illustrated in FIG. 8D.

In order to address this technical problem, when the fork member 103 is thickened, the weight increases and the costs also increases.

Third, as illustrated in FIG. 8B, since the gourd-shape hollow 108 is visible from the exterior, the external appearance is not good enough.

Hence, a dampener caster is desired which has a high shock absorbing performance and which has an excellent external appearance.

SUMMARY OF THE INVENTION

An objective is to provide a dampener caster which has a high shock absorbing performance and which has an excellent external appearance.

A two-wheel caster according to a first embodiment of the present disclosure includes:
  a rotation shaft component that rotates around a vertical axis;
  an arm member which is provided with a hollow, and which extends obliquely downwardly from a lower end of the rotation shaft component;
  an axle that is horizontally attached to a lower part of the arm member;
  a left wheel that is attached to a left end of the axle; and
  a right wheel that is attached to a right end of the axle.
The arm member includes:
  an axle supporting member which is stored in the hollow so as to be movable up and down, and which supports the axle;
  a compression coil spring which is stored in the hollow, and which pushes the axle supporting member; and
  a main rib that surrounds the hollow.
The axle supporting member includes:
  an axle receiving portion which is formed in a tadpole-like shape, corresponds to a head of the tadpole-like shape, and is provided with a shaft hole through which the axle is inserted; and
  a cantilever spring portion which corresponds to a tail of the tadpole-like shape, and which is continuous to the main rib.
The axle receiving portion is configured to be depressed against the main rib by the compression coil spring, and the cantilever spring portion and the compression coil spring are configured to deflect and to be compressed, respectively, so as to absorb shock when the left wheel and the right wheel go over an unevenness of a floor.

According to the present disclosure, shock is absorbed by two actions that are deflection of the cantilever spring portion and compression of the compression coil spring.

In comparison with a gourd-shape hollow of a conventional technology, the cantilever spring portion of the present disclosure can be largely deflected upwardly. Consequently, a dampener caster with a high shock absorbing performance can be provided according to the present disclosure.

It is preferable that the hollow should be hidden by the left wheel and by the right wheel.

Since the hollow is hidden by the left wheel and by the right wheel, an excellent external appearance is accomplished. Consequently, a dampener caster which has a high shock absorbing performance and which has an excellent external appearance can be provided according to the present disclosure.

It is preferable that the left wheel and the right wheel should be each provided with at least one window portion to make a part of the cantilever spring portion and/or a part of the compression coil spring visible.

Both of or either one of the cantilever spring portion or the compression coil spring may be worn out. In this case, the condition of the cantilever spring portion and that of the compression coil spring can be visually checked without a detachment of the left wheel or the right wheel, and an action in accordance with such a condition can be taken.

BRIEF DESCRIPTION OF THE DRAWINGS

Several preferable embodiments of the present disclosure will be described in detail with reference to the accompanying figures in which.

DETAILED DESCRIPTION OF THE EMBODIMENTS

Embodiments of the present disclosure will be described in detail with reference to the accompanying figures.

[Two-Wheel Caster]

Figure 1:
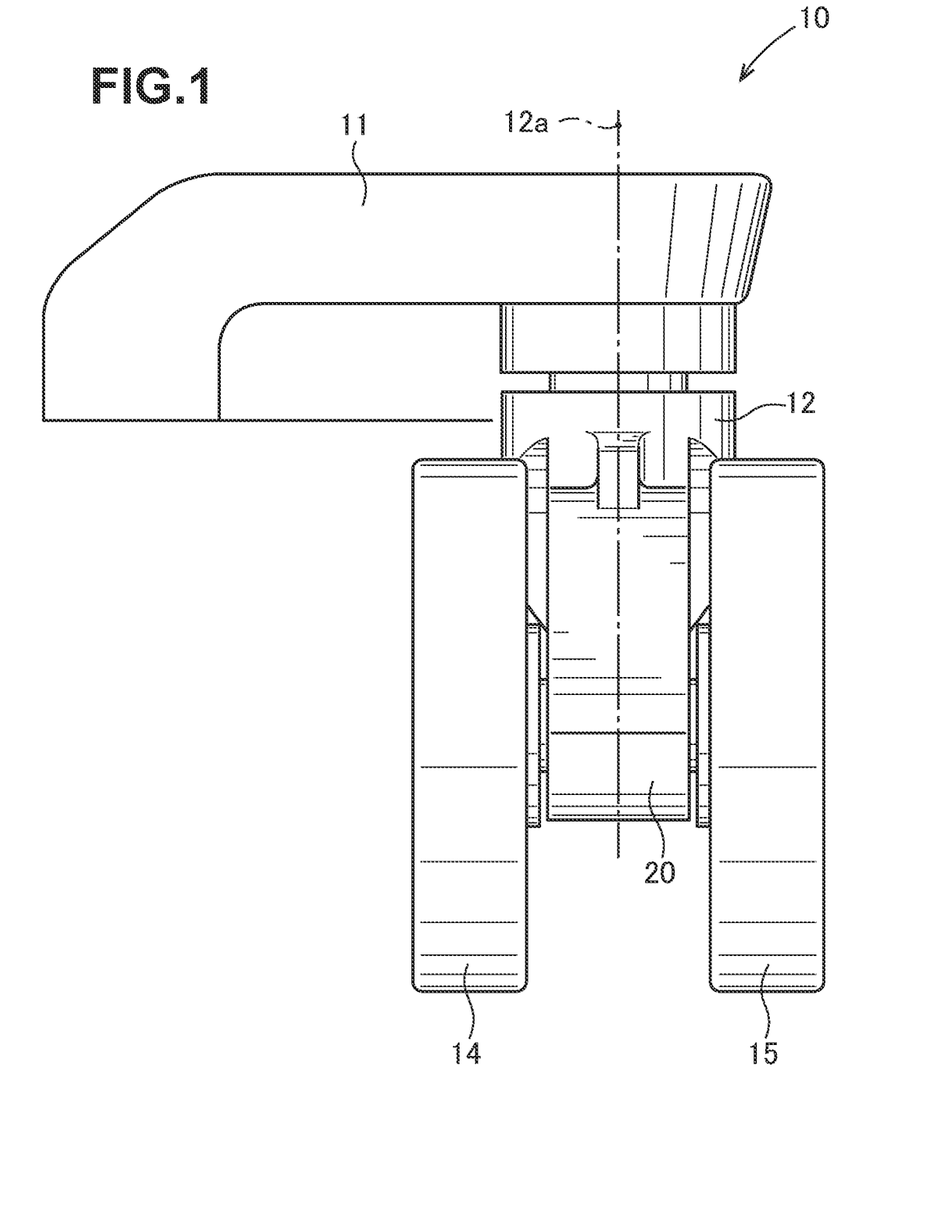
FIG. 1 a front view of the two-wheel caster according to the present disclosure.

As illustrated in FIG. 1, a two-wheel caster 10 includes a base member 11 that is attached to the bottom of a suitcase, a rotation shaft component 12 attached to the base member 11 so as to be rotatable around a vertical axis 12a, an arm member 20 that extends obliquely downwardly from the lower end of the rotation shaft component 12, an axle 13 (see FIG. 2) that is attached to the lower part of the arm member 20, a left wheel 14 that is attached to the left end of the axle, and a right wheel 15 that is attached to the right end of the axle.

Figure 2:
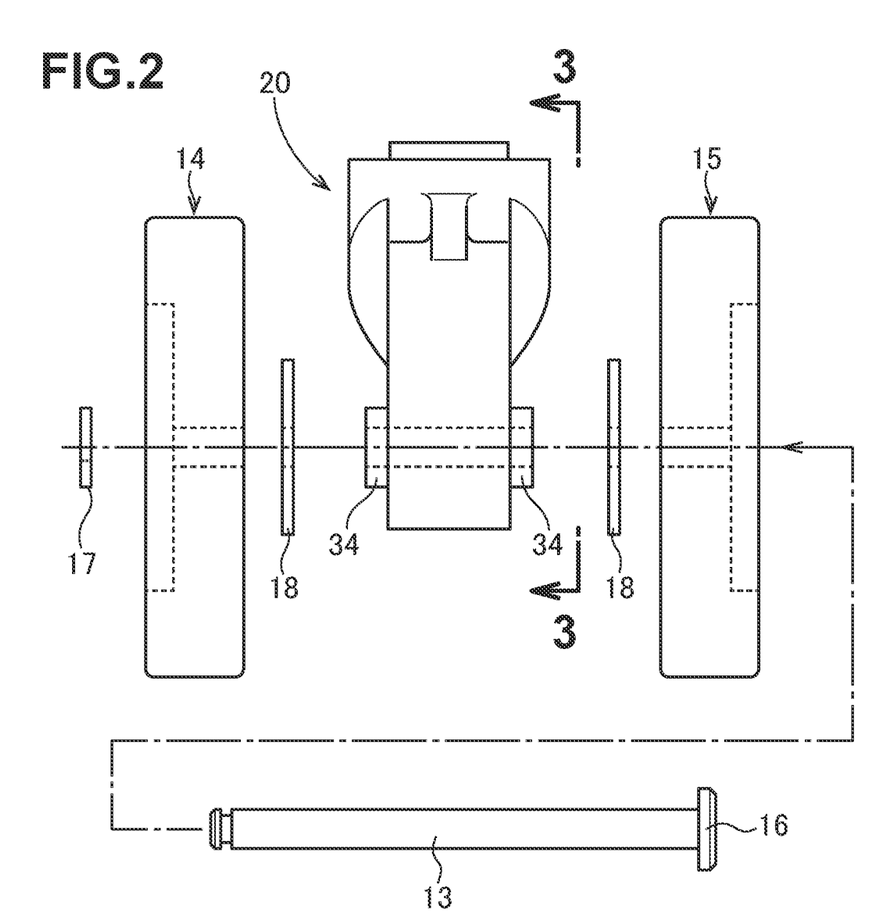
FIG. 2 an exploded view of the two-wheel caster.

As illustrated in FIG. 2, the arm member 20, the axle 13, the left wheel 14 and the right wheel 15 are the primary components. Note that, the axle 13 has a head 16 at one end, and a clip 17 is attached to the opposite end. The clip 17 prevents the left wheel 14 from being detached. The head 16 prevents the right wheel 15 from being detached. However, the structure of the axle 13 can be changed as appropriate.

A hole-formed disk plate 18 is provided between the left wheel 14 and the arm member 20. The hole-formed disk plate 18 prevents a boss 34 of the arm member 20 from being worn out by the rotating left wheel 14. Similarly, a hole-formed disk plate 18 is provided between the right wheel 15 and the arm member 20.

[Arm Member]

Figure 3:
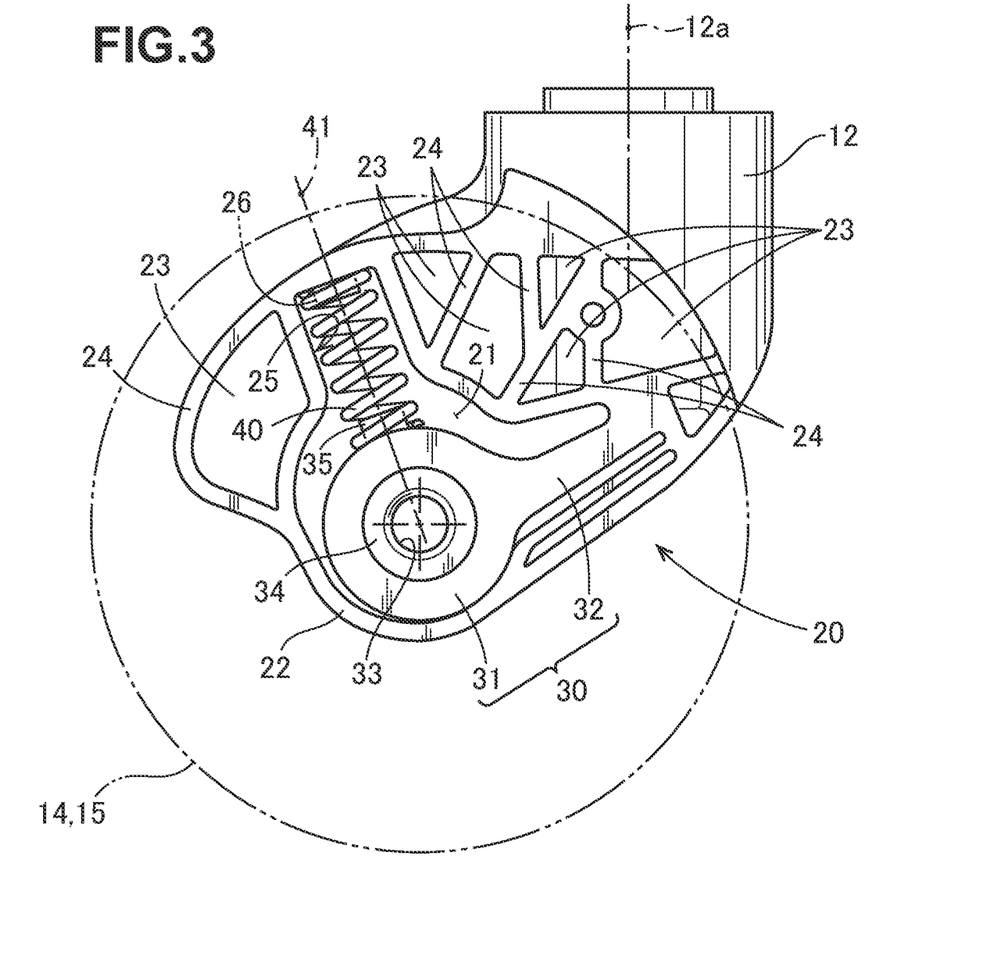
FIG. 3 is a diagram as viewed along arrows 3-3 in FIG. 2, and is a side view of an arm member.

As illustrated in FIG. 3, the arm member 20 extends obliquely downwardly from the lower end of the rotation shaft component 12 that extends along the vertical axis 12a. This arm member 20 is a block with a hollow 21. It is preferable that the block should be a resin molding component or a light metal forming component.

The arm member 20 includes a main rib 22 that surrounds the hollow 21, a plurality of thinned portions 23 coupled to the main rib 22, sub ribs 24 that surround those thinned portions 23, and an axle supporting member 30 that extends from the main rib 22 toward the hollow 21.

[Axle Supporting Member]

As illustrated in FIG. 3, the axle supporting member 30 is formed in a so-called tadpole-like shape, and includes an axle receiving portion 31 corresponding to the head of such a shape, and a cantilever spring portion 32 corresponding to the tail of such a shape. The tip of the cantilever spring portion 32 is continuous to the main rib 22. The axle receiving portion 31 includes a shaft hole 33 through which the axle 13 (see FIG. 2) passes, and the boss 34 that surrounds the shaft hole 33.

Preferably, the cantilever spring portion 32 has the reduced height dimension at the tip (the side continuous to the main rib 22) relative to the shaft-receiving-portion-31 side like the embodiment. That is, the tip is made thin relative to the base like a tail. Such a structure has following advantages.

The whole cantilever spring portion 32 is not bent at the same curvature, but the thin tip portion is bent largely. This enables the axle receiving portion 31 to promptly move upwardly when the left wheel 14 (and the right wheel 15) goes on an unevenness. After going over the unevenness, the axle receiving portion 31 promptly moves downwardly.

When a tail is formed in a tapered shape rather than a tail with a constant thickness, the compatibility to the unevenness improves, and thus shock is further efficiently eased.

However, since the stress at the tip of the tail becomes the maximum, and also the cross-sectional area of the tip of the tail is small, the stress at this site becomes the maximum. It is expected that the axle supporting member 30 is damaged after the utilization for a long time period. In this case, the damaged location is concentrated at the tip of the tail.

It is desirable to visually check the concentration location, i.e., the tip of the tail (the cantilever spring portion 32) through a window portion 19 to be described later with reference to FIG. 6. This is because if a defect such that a crack is formed can be checked, an action like a repair can be taken before it is completely damaged and broken.

Figure 4A:
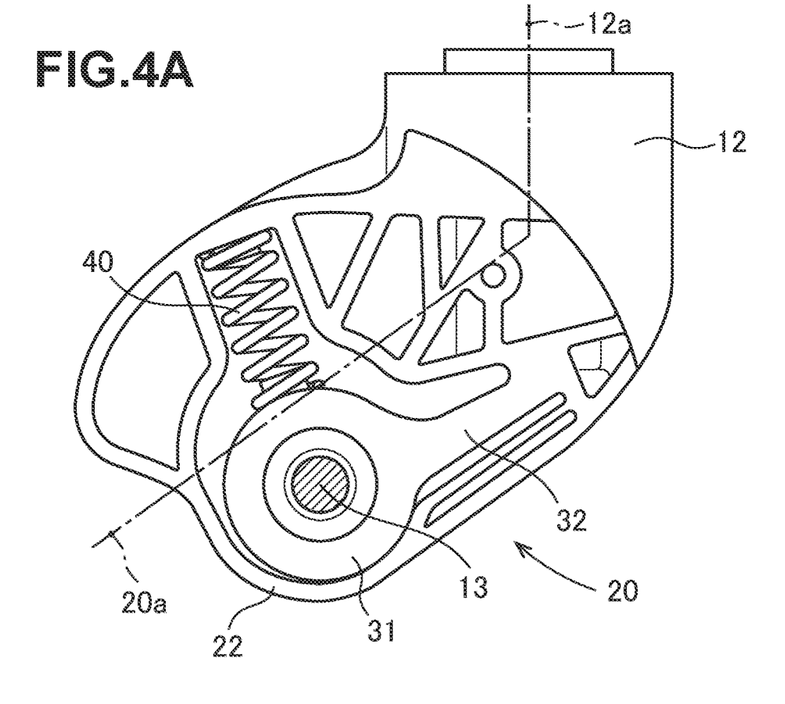
FIGS. 4A and 4B are each an action explanatory diagram of the arm member.

As illustrated in FIG. 4A, the cantilever spring portion 32 extends substantially in parallel with a center axis 20a of the arm member 20.

As illustrated in FIG. 3, although the hollow 21 passes completely through in the front back direction of the figure, the plurality of thinned portion 23 does not pass completely through in the front-back direction of the figure. However, providing the plurality of thinned portions 23 makes the arm member 20 sufficiently lightweight.

The hollow 21 includes a spring retaining portion 25 where a compression coil spring 40 is retained. At a portion corresponding to the spring retaining portion 25, the main rib 22 is integrally formed with an upper spring seat 26.

The axle receiving portion 31 is integrally formed with a lower spring seat 35.

The compression coil spring 40 is set between the upper spring seat 26 and the lower spring seat 35. A spring axis 41 passing through the center of the compression coil spring 40 passes through the center of the upper spring seat 26, the center of the lower spring seat 35 and the center of the shaft hole 33.

The spring axis 41 is provided at a position forming an angle of substantially 90 degrees relative to the lengthwise direction of the cantilever spring portion 32.

Actions of the arm member 20 that employs the above-described structure will be described below with reference to FIG. 4A and FIG. 4B.

As illustrated in FIG. 4A, the axle receiving portion 31 is normally depressed against the main rib 22 by reaction force of the compression coil spring 40.

The setting of the compression coil spring 40 is optional, but it is recommended that the axle receiving portion 31 is still in contact with the main rib 22 even packed goods with a predetermined weight are put in the suitcase. The term "predetermined weight" means the weight of the packed goods by what corresponds to a whole suitcase capacity.

In accordance with this recommendation, when the suitcase is put on a floor and when the suitcase laterally moves on the floor without any unevenness, a condition illustrated in FIG. 4A is substantially maintained.

When the suitcase reaches the unevenness of the floor, upward force is applied to the axle 13.

Figure 4B:
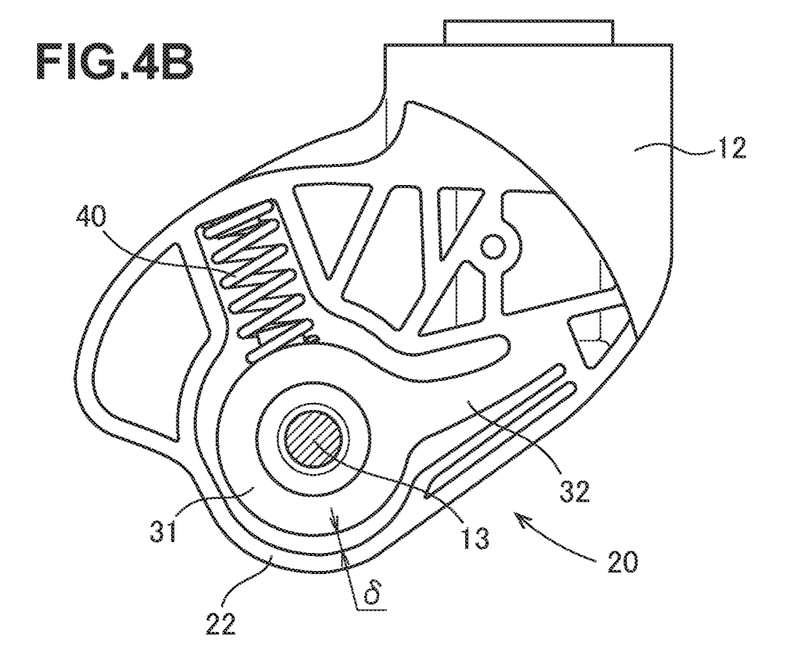

As illustrated in FIG. 4B, the cantilever spring portion 32 deflects upwardly by what corresponds to 8, and the compression coil spring 40 is compressed by what corresponds to 8.

Since the cantilever spring portion 32 is a cantilever spring, the product of the spring constant of the cantilever spring portion 32 and the deflection amount 8 thereof becomes reaction force.

As for the compression coil spring 40, the product of the spring constant and the compression amount 8 becomes reaction force.

From a formula that is (reaction force of cantilever spring portion 32+reaction force of compression coil spring 40)=upward force, when (sum of reaction forces of cantilever spring portion 32 and of compression coil spring 40) is balanced, the form illustrated in FIG. 4B is settled.

That is, shock due to the unevenness is absorbed by the deflection of the cantilever spring portion 32 and by the compression of the compression coil spring 40.

When the caster goes over the unevenness, the state returns to the state illustrated in FIG. 4A.

First Comparative Example

The fact that the embodiment of the present disclosure is advantageous in comparison with comparative examples will be described with reference to FIGS. 5A and 5B.

Figure 5A:
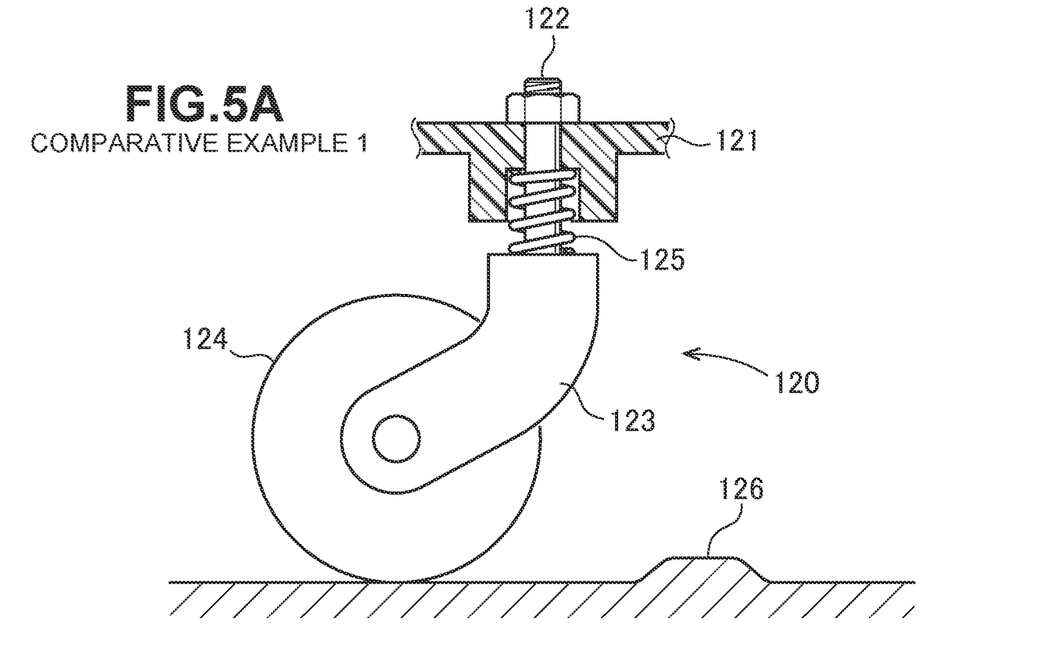
FIG. 5A is a diagram for describing a first comparative example.

FIG. 5A illustrates a first comparative example. A dampener caster 120 according to the first comparative example includes a base member 121, a bolt 122 inserted in the base member 121 from the lower side, an arm member 123 that extends obliquely downwardly from the lower end of the bolt 122, and a wheel 124 attached to the lower end of the arm member 123 so as to be freely rotatable. Moreover, a compression coil spring 125 is provided between the base member 121 and the arm member 123.

When the wheel 124 goes on an unevenness 126 of a floor, the compression coil spring 125 is compressed, and when the wheel 124 goes over the unevenness 126, such a spring returns to the original state.

According to the structure of the first comparative example, however, the bolt 122 inevitably becomes long, and every time the wheel goes over the unevenness 126, bending force is applied to the bolt 122. In order to withstand such bending force, it is necessary to increase the external diameter of the bolt 122, and thus the dampener caster 120 increases the weight.

Second Comparative Example

Figure 5B:
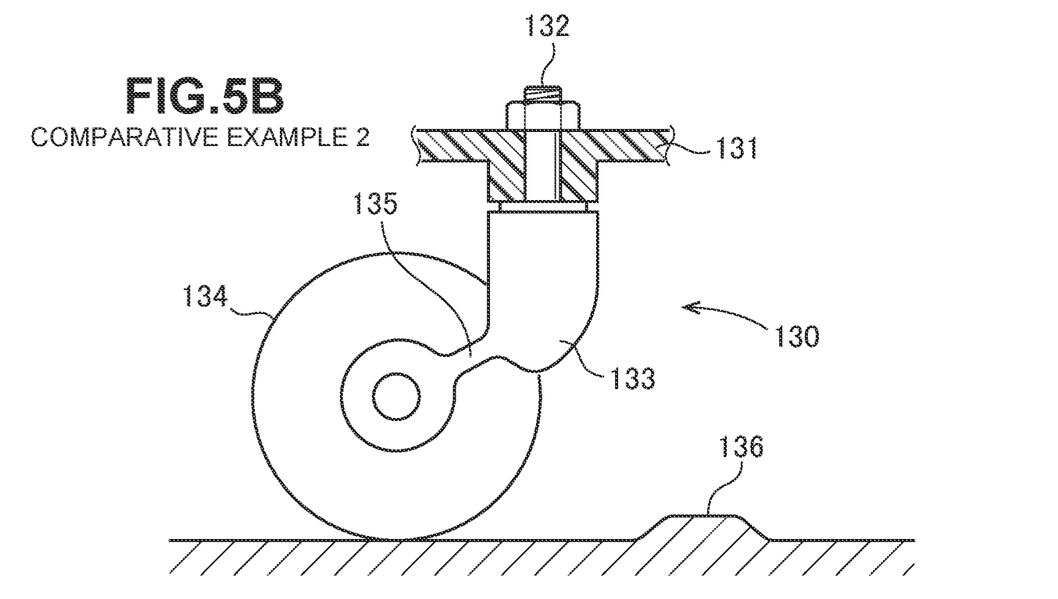
FIG. 5B is a diagram for describing a second comparative example.

FIG. 5B illustrates a second comparative example. A bolt 132 is short according to the second comparative example.

A dampener caster 130 according to the second comparative example includes a base member 131, a bolt 132 that is inserted in the base member 131 from the lower side, an arm member 133 that extends obliquely downwardly from the lower end of the bolt 132, and a wheel 134 attached to the lower end of the arm member 133 so as to be freely rotatable. The arm member 133 is provided with a constricted portion 135.

When the wheel 134 goes on an unevenness 136 of a floor, the constricted portion 135 deforms, and when the wheel 134 goes over the unevenness 136, such a portion returns to the original state. Since the bolt 132 is short, there is an advantage such that the external diameter of the bolt 132 may be small. Conversely, there is a disadvantage such that the external appearance decreases when the constricted portion 135 is visible from the exterior.

Meanwhile, the arm member 133 is formed of a resin or a light metal. A creep is inevitably produced in the case of a resin and a light metal. The term "creep" means a phenomenon in which a body gradually deforms permanently as time advances when certain load is applied to the body.

According to the structure of the second comparative example, a permanent deformation occurs on the constricted portion 135 after being utilized for a long time period, and becomes unable to return to the original state. Eventually, the constricted portion 135 breaks.

In order to avoid a breakage, when the cross-sectional area of the constricted portion 135 is increased, the deformation capability decreases. Hence, every time the wheel goes over the unevenness 136, the base member 131 moves up and down. This up-and-down movement causes the suitcase to move up and down, resulting in an inconvenient usability.

Advantageous Effects of Present Disclosure

In contrast, according to the present disclosure, when the wheel goes over an unevenness, as illustrated in FIG. 4B, moderate deflection of the cantilever spring portion 32 eases shock to be applied to the suitcase.

In addition, Since the cantilever spring portion 32 is a cantilever that has a characteristic to be deflected up and down, the axle 13 is easily displaced upwardly. Accordingly, the dampener caster 10 that has a higher shock absorbing performance than those of conventional technologies is provided.

Moreover, according to the present disclosure, as illustrated in FIG. 4A, the axle receiving portion 30 is depressed against the main rib 22 by force of the compression coil spring 40 at most of the time (from a time at which the suitcase is empty and until the packed goods with a predetermined weight is packed in). In this state, since the cantilever spring portion 32 is not deflected, a creep does not occur.

In addition, in FIG. 4A, the width in the front and back direction of the figure (the width of the cantilever spring portion 32) can be increased, and thus stress at the cantilever spring portion 32 can be reduced. When the stress is small, the possibility of the occurrence of cracks due to fatigue decreases.

Consequently, the dampener caster 10 that decreases the possibility of an occurrence of a creep and of a crack is provided by the above-described structure of the present disclosure.

Figure 6:
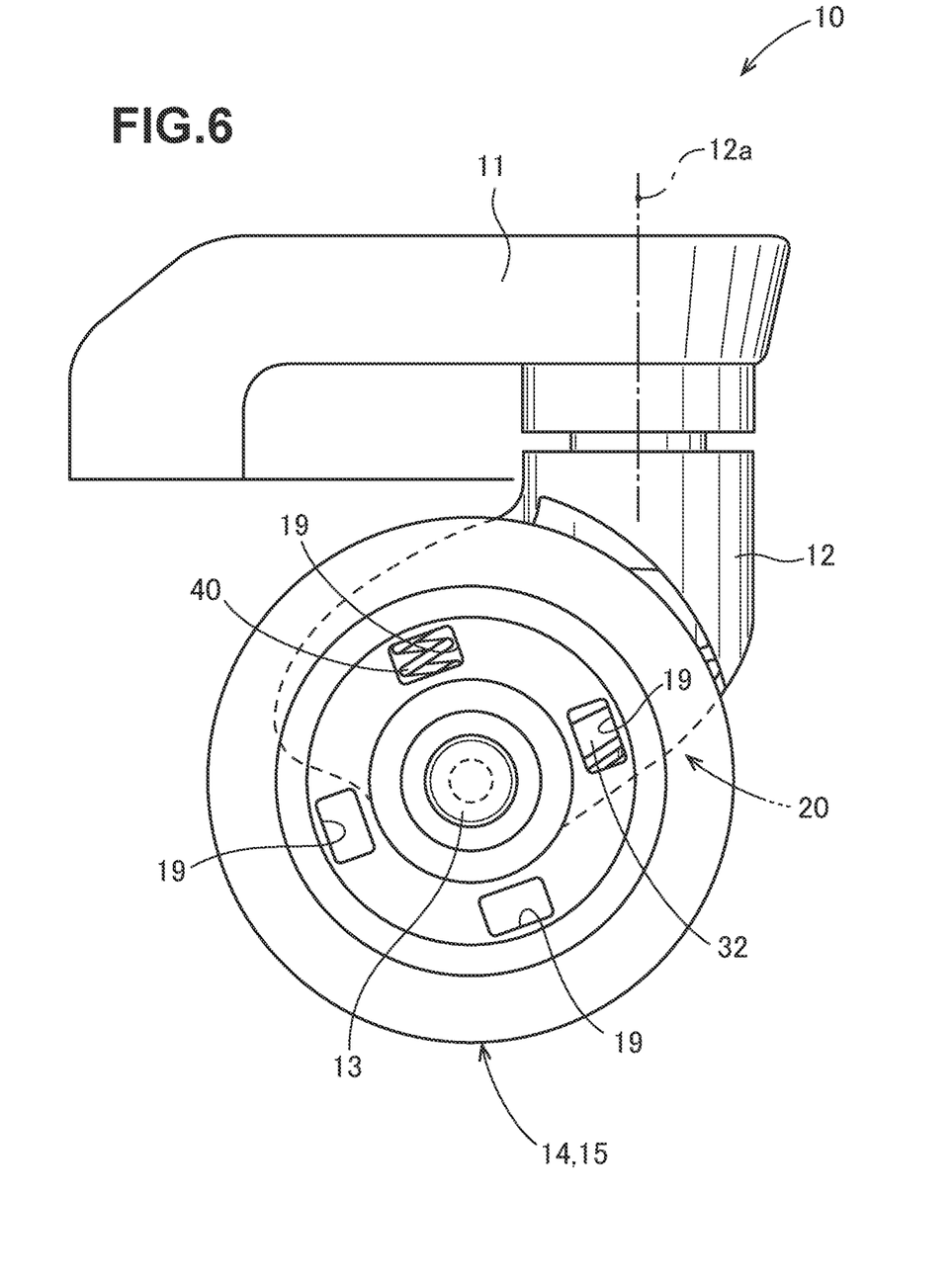
FIG. 6 is a side view of the two-wheel caster.

As illustrated in FIG. 6, the most portions of the arm member 20 is hidden by the left wheel 14 and by the right wheel 15, and the hollow 21 that is described with reference to FIG. 3 is invisible. Consequently, the external appearance remarkably improves.

When the packed goods contain many metal products, books and paper-products, the weight of the packed goods exceeds the predetermined weight. When the frequency of such an occasion is often, there might be a possibility such that a "wear" occurs on the cantilever spring portion 32 and the compression coil spring 40 illustrated in FIG. 3.

[Window Portion]

Hence, as illustrated in FIG. 6, it is preferable to provide, in the left wheel 14 and in the right wheel 15, the window portions 19 which enable a visual check for a part of the cantilever spring portion 32 and/or a part of the compression coil spring 40. The horizontal dimension of the window portion 19 is set to be the same as the width of the spring retaining portion (see FIG. 3, reference numeral 25).

When either one of or both of the cantilever spring portion 32 and the compression coil spring 40 might have a defect, the condition thereof can be checked through the window portions 19 without detaching the left wheel 14 or the right wheel 15.

The desirable number of the window portions 19 is four provided at a pitch of 90 degrees.

First, turning the left wheel 14 (or the right wheel 15) by hand by 90 degrees maximally causes the state to be as illustrated in FIG. 6.

Second, in FIG. 6, both the cantilever spring portion 32 and the compression coil spring 40 are visible and can be checked.

Figure 7A:
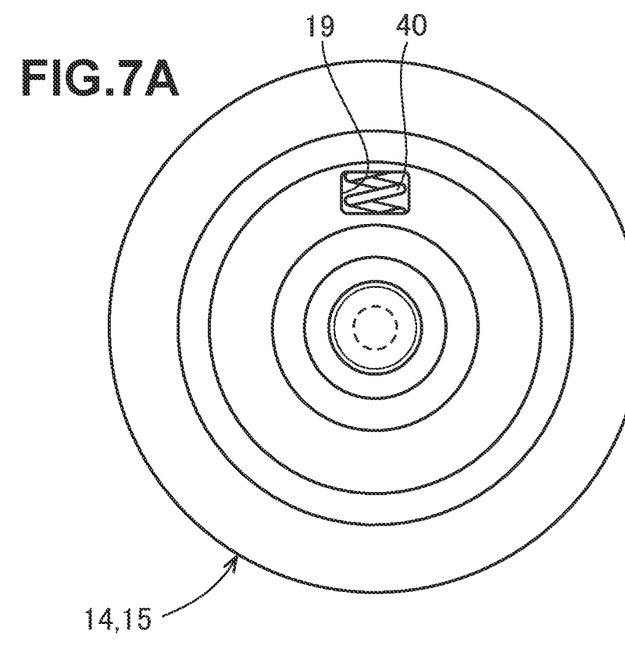
FIGS. 7A and 7B are each a diagram for describing a modification of the two-wheel caster.

Third, since the window portions 19 are placed at an equal pitch, a balance in design is achieved, improving the appearance with such a design Modified Examples for Window Portion As illustrated in FIG. 7A, only a single window portion 19 may be provided.

Turning the left wheel 14 (or the right wheel 15) clockwise by 90 degrees from the state as illustrated in FIG. 7A causes the window portion 19 to be positioned on the cantilever spring portion (see FIG. 6, reference numeral 32).

That is, either one of the cantilever spring portion (see FIG. 6, reference numeral 32) or the compression coil spring 40 can be selectively checked visually by a single window portion 19.

Figure 7B:
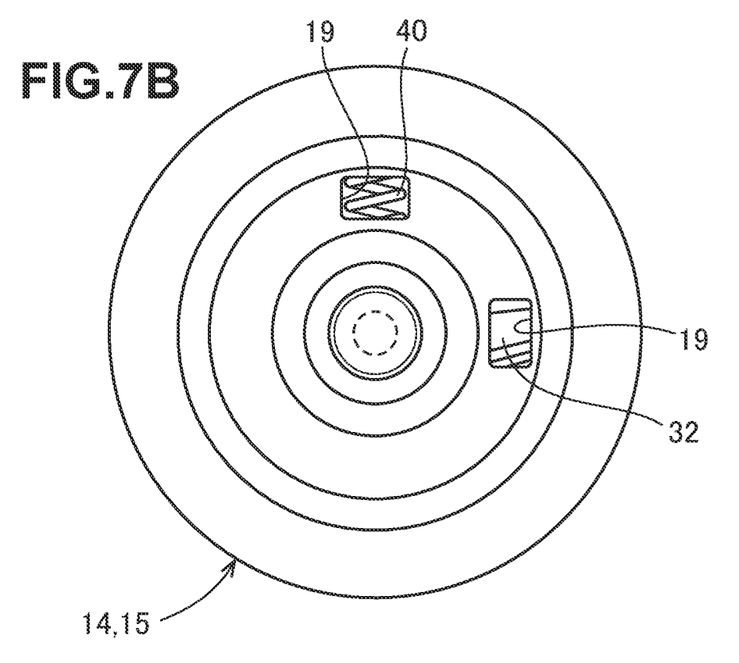

Moreover, as illustrated in FIG. 7B, a pair of (i.e., two) the window portions 19 may be provided. This enables both the cantilever spring portion 32 and the compression coil spring 40 to be checked visually simultaneously.

However, with reference to a clock, since the window portions 19 are provided at the position of 12:00 and at the position of 15:00, respectively, a balance in design is not completely achieved. Hence, the appearance with such a design is not better than a design in which the four window portions are provided.

Moreover, when the design with a single window portion and the design with the two window portions are compared with each other, the design with the single window portion causes such a portion not to be easily noticed, and thus the appearance with such a design is better.

That is, when the left wheel 14 and the right wheel 15 each have at least one window portion 19 to visually check a part of the cantilever spring portion 32 and/or a part of the compression coil spring 40, the cantilever spring portion 32 and the compression coil spring 40 can be checked visually. In addition, in view of both the usability and the design, the number of window portions 19 may be selected from four, two or one.

Note that when a predetermined number of times of utilization does not cause the cantilever spring portion 32 and the compression coil spring 40 to be worn out, the window portion 19 may be eliminated so as to improve the external appearance of the left wheel 14 or that of the right wheel 15.

Moreover, the two-wheel caster 10 of the present disclosure is applied to not only the bottom of a suitcase and that of a bag but also a carriage, a cabinet, a carrier, and other equivalent movable bodies.

The two-wheel caster of the present disclosure is suitable for a suitcase, etc.

What is claimed is:

1. A two-wheel caster comprising:
   a rotation shaft component that rotates around a vertical axis;
   an arm member which is provided with a hollow, and which extends obliquely downwardly from a lower end of the rotation shaft component;
   an axle that is horizontally attached to a lower part of the arm member;
   a left wheel that is attached to a left end of the axle; and
   a right wheel that is attached to a right end of the axle,
   wherein the arm member comprises:
      an axle supporting member which is stored in the hollow so as to be movable up and down, and which supports the axle;
      a compression coil spring which is stored in the hollow, and which pushes the axle supporting member; and
      a main rib that surrounds the hollow,
   wherein the axle supporting member is formed in a tadpole-shape and comprises:
      an axle receiving portion which corresponds to a head of the tadpole-shape, and is provided with a shaft hole through which the axle is inserted; and
      a cantilever spring portion which corresponds to a tail of the tadpole-shape, and which is continuous to the main rib,
   wherein the axle receiving portion is configured to be depressed against the main rib by the compression coil spring, and the cantilever spring portion and the compression coil spring are configured to deflect and to be compressed, respectively, so as to absorb shock when the left wheel and the right wheel go over an unevenness of a floor.

2. The two-wheel caster according to claim 1, wherein the hollow is hidden by the left wheel and by the right wheel.

3. The two-wheel caster according to claim 2, wherein the left wheel and the right wheel are each provided with at least one window portion to make a part of the cantilever spring portion and/or a part of the compression coil spring visible.

\* \* \* \* \*